United States Patent [19]

Catt

[11] 4,333,161

[45] Jun. 1, 1982

[54] DATA PROCESSING APPARATUS OPERATIVE ON DATA PASSING ALONG A SERIAL, SEGMENTED STORE

[76] Inventor: Ivor Catt, "Hartspring", 17 King Harry Lane, St. Albans, Hertfordshire, England

[21] Appl. No.: 116,848

[22] Filed: Jan. 30, 1980

Related U.S. Application Data

[63] Continuation-in-part of Ser. No. 974,482, Dec. 29, 1978, abandoned, which is a continuation of Ser. No. 785,177, Apr. 6, 1977, abandoned.

[51] Int. Cl.[3] .................. G06F 13/00; G06F 3/00; G11C 21/00; G11C 19/00
[52] U.S. Cl. .................................. 364/900; 365/73; 365/78
[58] Field of Search ... 364/200 MS File, 900 MS File; 365/73, 78

[56] References Cited

U.S. PATENT DOCUMENTS

| | | | |
|---|---|---|---|
| 2,982,472 | 5/1961 | Huskey | 364/200 |
| 3,544,976 | 12/1970 | Collins | 364/200 |
| 3,651,472 | 3/1972 | Holtey | 364/200 |
| 3,713,096 | 1/1973 | Comfort | 364/200 |
| 3,735,362 | 5/1973 | Ashany | 364/200 |
| 3,755,789 | 8/1973 | Collins | 364/200 |
| 3,913,072 | 10/1975 | Catt | 364/900 |
| 4,007,450 | 2/1977 | Haibt | 364/200 |
| 4,064,556 | 12/1977 | Edelberg | 364/900 |

Primary Examiner—James D. Thomas
Attorney, Agent, or Firm—Robert F. O'Connell

[57] ABSTRACT

A serial recirculating store is provided with data processing units distributed along its length and a fast data line interacts with the serial store at each processing unit for controlling processing operations. The store is divided into segments with selectively operable bypass lines. A processing unit can operate on information passing therethrough from the associated segment and from the succeeding segment via the bypass line. Autonomous data processing routines can be effected in recirculating portions of the store as data thereon repeatedly leapfrogs other data utilizing the bypass lines.

3 Claims, 12 Drawing Figures

DATA PROCESSING APPARATUS OPERATIVE ON DATA PASSING ALONG A SERIAL, SEGMENTED STORE

RELATED APPLICATIONS

This application is a continuation-in-part of my application Ser. No. 974,482 filed Dec. 29, 1978 and now abandoned and which was itself a continuation of my application Ser. No. 785,177 filed Apr. 6, 1977 and also now abandoned.

The present invention relates to data processing apparatus comprising a serial store with means for obtaining access to the store at a plurality of nodes for the purpose of instituting data processing operations upon data in different segments of the store.

In my U.S. Pat. No. 3,913,072 I have described apparatus of this nature wherein the serial store forms a so-called slow line which is paralleled by a fast data line. At each node, switching means enable the fast line to put itself in communication with a segment of the store for the purpose of reading or writing data. The node at which communication is established is selected by a form of content addressing. A part of the data on the fast line is an address which is matched with an address field in the required segment of the store. When a match is found, the read or write operation is performed between a data field in the fast line information and a data field in the selected segment. Such apparatus enables a serial store to be addressed in the manner of a RAM such as a core store, whereby the access time is very markedly reduced compared with a conventional serial store with access only at one point.

It should be mentioned that the address matching can take various forms such as matching for identity, matching for identity of only one part of the address fields, or matching within specified limits, e.g., with one or more bits having "don't care" status. This can lead to multiple matches if required.

The aforesaid specification also explains that it is possible to go beyond the mere reading and writing of data. Data processing circuits can be provided for performing processing operations upon the stored data. For example, what may be called a processing unit can be provided at each node for performing operations commanded along the fast line. The processing unit can be a simple arithmetical or logic unit capable of performing a small set of basic serial operations, e.g., adding fast line data to slow line data.

The problem with such an apparatus is that the utilization of the data processing units is inefficient because every elementary operation has to be commanded along the fast line.

The object of the present invention is to provide apparatus which overcomes this problem and is capable of being arranged to perform conventional computing operations in an efficient and rapid way, in spite of the basic serial organization of the data storage, and which is also particularly well suited to perform data processing operations in relation to digitally simulated mappings of physical situations (as explained below).

It is an important advantage of the invention that the apparatus can be (although this is not essential) constructed in the manner explained in the aforementioned specification, where the circuit configuration is not established solely in a hard-wired manner but is established operationally in a way which enables defective regions of an integrated circuit chip to be bypassed. This leads to a high degree of operational reliability. For simplicity, this matter will not be mentioned again but should be kept in mind in relation to the description of the present invention.

The present inventin provides data processing apparatus comprising a serial store formed of segments between nodes, a fast data line having access to each node, a plurality of by-pass lines for selectively bypassing portions of the serial store, each of which portions comprises one or more segments, switching means at the nodes controllable by commands on the fast data line to connect in selected by-pass lines and link the correspondingly bypassed store portions into closed loops, and a plurality of data processing units each operable to perform a data processing operation involving information passing along a by-pass line and round the closed loop associated therewith.

The fundamental significance of such apparatus is that data processing operations themselves do not involve the fast line which is required only in read or write operations and for the purpose of controlling the switching means. Therefore, the fast line is not used in a wasteful manner and the overall speed of operation of the apparatus is greatly increased. In particular, it is possible to set up different portions of the serial store, also referred to as the slow line, to perform operations simultaneously.

The reason why the fast line is not involved in a data processing operation is that the operation involves the recirculating information in a closed loop and the information which is bypassing or leapfrogging the recirculating information.

For convenience, the information in one segment may be regarded as a word, although it may comprise several words or bytes as conventionally understood. In general, the information in a word can include any or all of address information (allowing addressing by segment content), data and instruction information.

The processing operations involving a recirculating word and the bypassing word could be predetermined by the structure of the processing units although this is not regarded as a desirable arrangement. It is preferred to make the processing units instruction-controlled, being capable of selectively performing different operations such as elementary arithmetical and logical operations. At least part of one of the words involved then forms an instruction (perhaps better referred to as a microinstruction) which selects the operation to be performed.

In an important development of the invention, major portions of the slow line are treated as if they were linked in a closed loop, where a major portions consists of a plurality of the aforesaid portions. A major portion of the slow line may then be set up with data and instructions, treated as a closed loop and left to execute autonomously a sub-routine formed by the instructions as this major portion circulates round the slow line. A portion and a major portion will now be referred to respectively as a minor loop and a major loop, although it will be understood that the minor loop is only a closed loop when it is bypassed and a major loop is only regarded as "closed" because it is treated functionally as an independent part of the slow line and is closed in the sense that it autonomously executes a sub-routine, as already stated, this being possible because the words therein can pass each other and become involved in processing operations, as the minor loops are selectively bypassed. In this situation, a minor loop is conveniently one segment only.

As another matter of convenience in terminology, it may be said that a closed loop whether minor or major, is looping, i.e., recirculating, whereas an unclosed loop is barrelling, i.e., "rolling" along the slow line. Within a looping major loop, alternate single segment minor loops may be looping with the intervening minor loops barrelling. However, it may be preferable to arrange the single segment minor loops in groups, each containing a plurality of adjacent segments. Then the minor loops of alternate groups are arranged to loop while the minor loops of the intervening groups barrel. The status may be changed over so that firstly, the odd groups barrel past or leapfrog the even groups, then the even groups leapfrog the odd groups, and so on until execution of the sub-routine is complete. In this way the major loop, which is actually only travelling round the slow line and which has no physical connection closing the major loop itself, can act as if it were physically closed. The preferred arrangement is, however, described below in conjunction with FIG. 11.

Escape from the looping status of a major loop can be arranged in various ways. It can be effected purely by external control. For example, a central supervisory circuit can cause the major loop to barrel again, i.e., consist solely of barrelling minor loops, after leaving enough time for the sub-route to be executed therein. Alternatively, the central circuit can periodically check to ascertain whether or not the sub-routine is complete. Preferably, however, the major loop flags on the fast line when the sub-routine is complete.

The invention is of particular utility outside the realm of ordinary digital data processing. The store can hold data which maps some physical attribute of a two or more dimensional field. Since the store is essentially a one-dimensional structure, it is necessary to treat the multi-dimensional field as a multi-dimensional array of data points arranged in rows, e.g., after the fashion of a television raster, the rows of data points being serially arranged in the store. Many situations arise in which data processing operations should be carried out on the data of data points adjacent in the array. Some such data points are also adjacent in the store, i.e., when they are in the same row, but other data points which are adjacent in the array are widely spaced in the store. By the selective use of looping and barrelling, such data points can be brought together for the relevant processing operations.

The invention will be described in more detail, by way of example, with reference to the accompanying drawings, in which.

Figure 1:
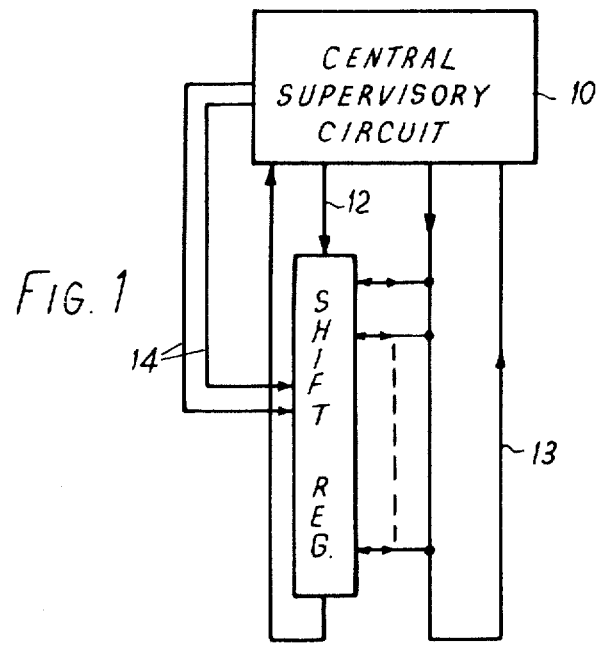
FIG. 1 is a schematic block diagram of a computer embodying the invention.

FIG. 1 shows a central supervisory circuit (CSC) 10 which controls the operation of a combined serial store and data processing system via a fast data line 13. The serial store, referred to also as a slow data line 12, is in the form of a long recirculating shift register which runs from the CSC 10 and back to the CSC 10. The fast data line 13 also runs from the CSC and back thereto via a plurality of nodes, described below, to which the fast line has effectively simultaneous access.

The construction of the CSC 10 forms no part of the present invention. It is required to send to the store and processing system instructions and data to be operated upon and stored and to receive processed and read-out data, as explained below. It is merely necessary to observe that, because it is interacting with a serial circuit, information from the CSC must be sent at the correct time. This is a well known requirement whenever interacting with a serial circuit. The overall timing is, in fact, controlled from the CSC 10 which sends two-phase clock signals on line 14 to the serial store which is in the form of a long shift register (see the aforementioned specification), along which information is clocked.

Figure 2:
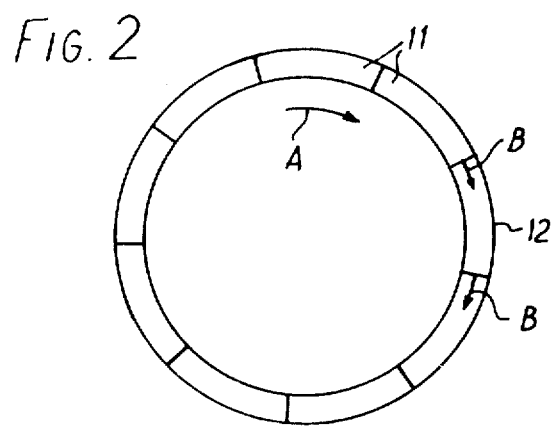
FIG. 2 is a schematic representation of the organization of the slow line or store.

Referring now to FIG. 2, the slow line 12 can be represented as a closed shift register (by virtue of the recirculating connection via the CSC 10) around which information is clocked in the direction of the arrow A. The shift register can be furthermore regarded as partitioned into a plurality of major loops 11, each of which is treated as an independent entity. FIG. 2 must be regarded as a time-frozen representation; the major loops actually all circulate around the shift register as indicated by arrows B. Moreover the major loops may be of varying lengths and the way in which the shift register is partitioned into major loops is not fixed; major loops may be split or joined to alter the pattern of major loops into which the shift register is partitioned. In other words, subdivision of the slow line into major loops is a functional matter.

Constructionally, the slow line 12 comprises a multiplicity of segments or minor loops 15 (FIG. 3) which extend between nodes 16. A major loop includes a plurality of minor loops 15 and each minor loop can store a long "word," say 40 bits or substantially more.

Figure 3:
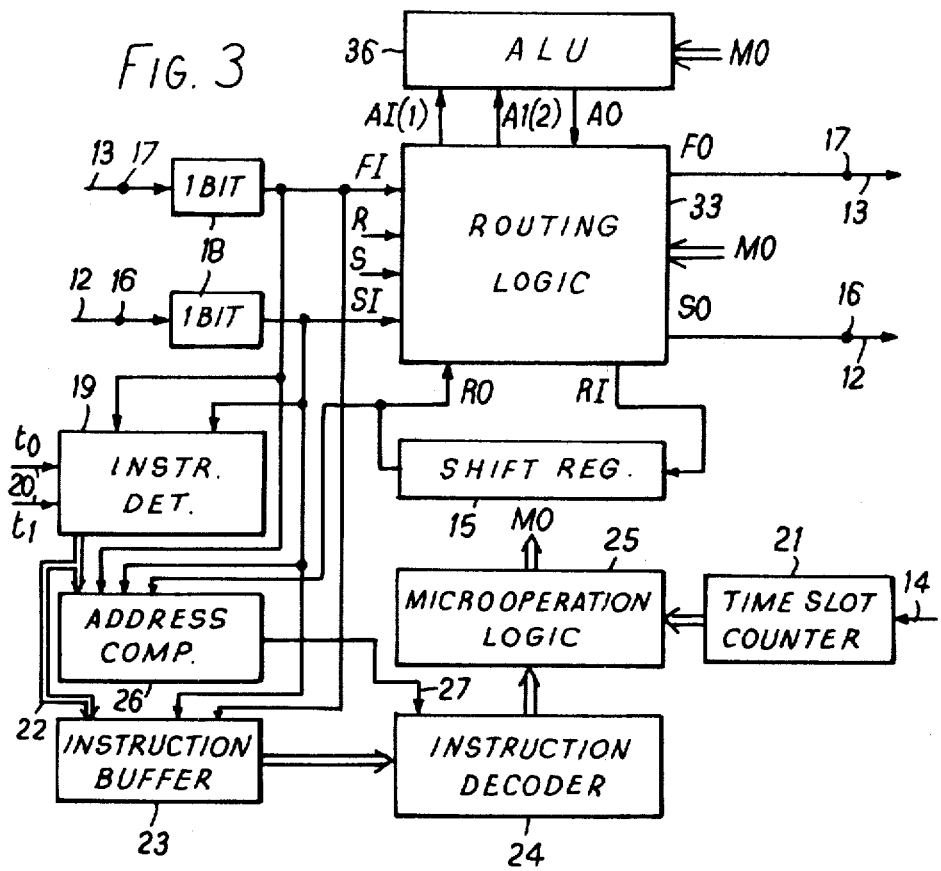
FIG. 3 is a schmatic block diagram of one minor loop.

FIG. 3 shows a single minor loop extending between nodes 16 (slow line) and nodes 17 (fast line). The fast and slow lines 13 and 12 enter through one bit buffer stages 18 which are clocked from the clock lines 14 (FIG. 1) and whose outputs are connected to routing logic 33 having the following inputs and outputs:

FI = fast line in
SI = slow line in
FO = fast line out
SO = slow line out
RI = input to register
RO = output from register
AI(1) & AI(2) = inputs to arithmetic and logic unit (ALU).
AO = output from ALU A shift register 15 is connected between RI and RO and constitutes the segment of the slow line. An ALU 36 is connected between AI(1) and (2) and AO. The ALU can be any of a wide range of well-known devices ranging from an adder through a unit with a more extended arithmetical instruction set to a relatively sophisticated micro-processor such as are available from Texas Instruments Company, Dallas, Tex. under various model numbers (e.g. TMS 1000, TMS 1100 and TMS 1200).

The routing logic 33 is an assemblage of gating devices such as are customarily provided in a digital computer to control the routing of data under the control of micro-operation signals MO. The main configurations of the routing logic 33 will now be explained with reference to FIG. 4 etc.

Figure 4:
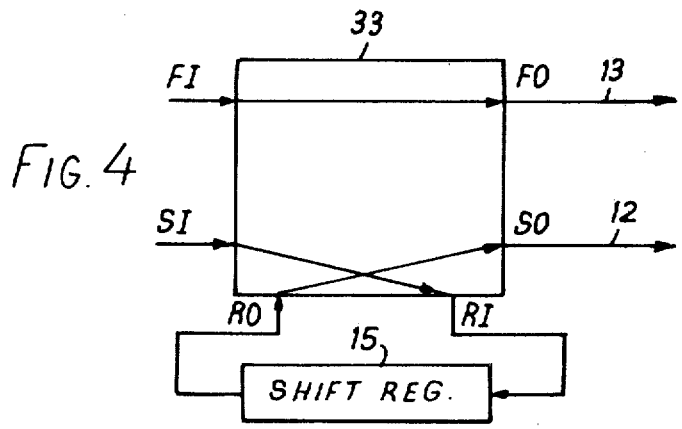
FIGS. 4 to 8 show two different minor loop configurations.

FIG. 4 shows FI connected to FO while the slow line is completed between SI and SO through the register 15. This is the serial or barrelling configuration. The construction of the logic 33 can be exemplified with reference to the FIG. 4 configuration. The configuration can be set up using three AND gates. One gate, when enabled, connects FI to FO. Another connects SI to RI and the third connects RO to SO.

Figure 5:
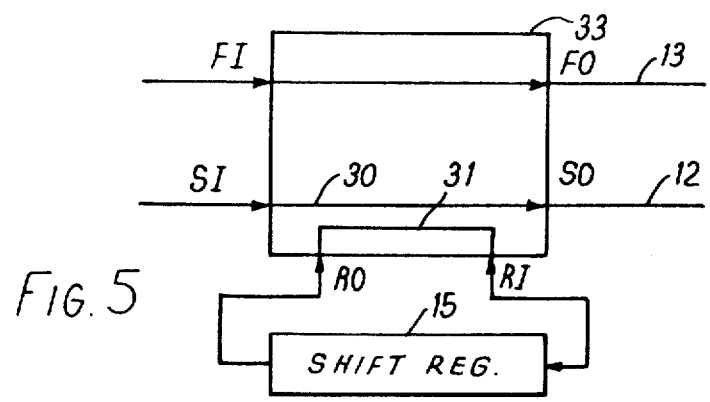

FIG. 5 shows SI connected to SO by a bypass line 30 while the shift register 15 is closed upon itself by a feedback line 31. This is the recirculating or looping configuration.

Figure 6:
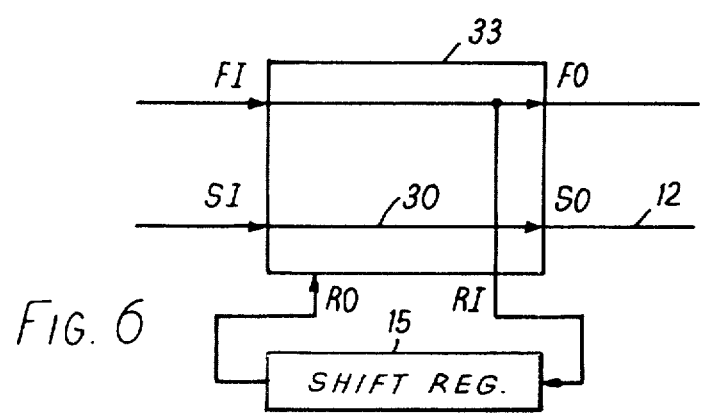
Figure 7:
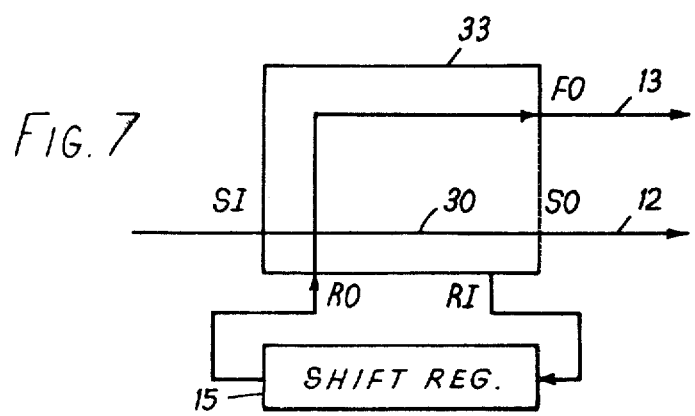

FIG. 6 shows the configuration for writing from the fast line into the slow line and FIG. 7 shows the configuration for reading from the slow line into the fast line. In FIG. 7 the slow line configuration could alternatively be in FIG. 5, i.e., "read" combined with "recirculate." This provides non-destructive read-out whereas FIG. 7 illustrates destructive read-out.

Figure 8:
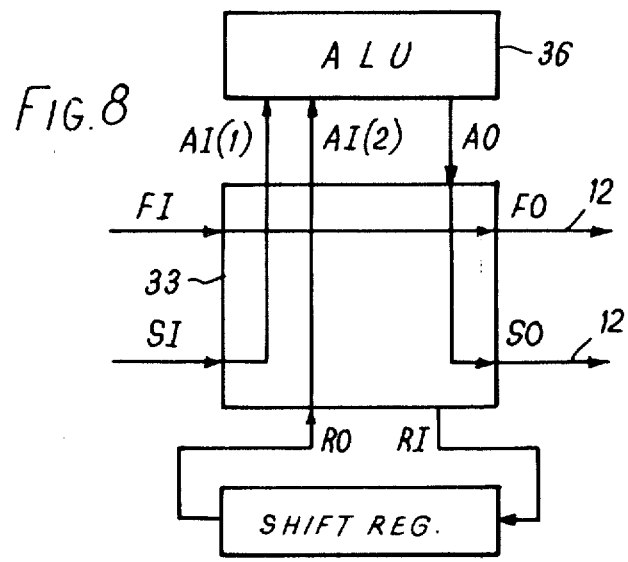

FIG. 8 shows the configuration for performing an operation by the ALU on WORD 1, provided by Si and WORD 2 provided by RO. The result word becomes the new WORD 2 since AO is connected to SO.

Figure 9:
FIG. 9 shows a word format.

Clearly additional configurations, not illustrated are possible. It will be understood that, as is customary in computer design, the configurations are changed by the MO signals during the course of a word time to apply different operations to different fields of the words being processed. In this connection, FIG. 9 shows a possible word format. At the least significant end is a bit $b_o$ followed by a bit $b_1$. These bits can be designated $FIb_o$, $SIb_o$ and so on to indicate which word they belong to. On either the fast line or the slow line, $b_1 = 1$ indicates an instruction. However, $FIb_o$ is an "inhibit" bit which has to be 0 for a fast line instruction to be effective. $FIb_o = 1$ hands over control to a possible instruction on the slow line. $SIb_o$ on the other hand is used to indicate a word in a sub-routine, i.e. when $SIb_o = 1$. $b_1$ is followed by an address field, one or more bits $b_m$ which may be blank or dedicated to flag functions such as flagging an address match, an instruction field, a data field and a flag bit $b_n$ for flagging an overflow bit. The configuration of FIG. 8 will only be set up during the data field for example.

The micro-operation logic 25 is therefore merely an example of the logic conventionally used in digital computers to control the machine states. Every instruction is decoded to a specific set of MO signals on a time-slot by time-slot basis.

Returning to FIG. 3, an instruction detector 19 is timed on lines 20 from a time slot counter 21 to apply tests to the bits $b_o$ and $b_1$ at time slots $t_o$ and $t_1$. The instruction detector 19 supplies control signals to an instruction buffer 23 and an address comparator 26 on lines 22, these control signals being timed by the time. slot counter 21. If $FIb_1 = 1$ and $FIb_o = 0$, a signal on a line 22 gates the instruction field of FI into the instruction buffer 23. A fast line instruction thus acts as an interrupt, taking precedence over all slow line instructions at all segments of the slow line. All sections enter the recirculating configurations of FIG. 5.

The buffered instruction is decoded by a conventional instructions decoder 24. The decoded instructions are gated with timing waveforms from the time slot counter 21, which runs at bit rate (or a multiple thereof). The gating is performed in microoperation logic 25 which provides the MO signals controlling both the routing logic 33 and the ALU 36.

The buffered instruction is obeyed only by the addressed segment. The addressed segment is that segment whose address field in RO matches the addressed field in FI. The match is detected by the serial address comparator 26 which is rendered operative only during the address field by the signals on lines 22 from the counter 21. Still subject to the condition $FIb_1 = 1$ and $FIb_o = 0$, the comparator 26 is commanded to compare the address fields of FI and RO. Whichever address comparator 26 detects a match applies a signal on line 27 to cause the decoder 24 to decode and thus obey the instruction. All segments with no address match stay in the recirculating configuration of FIG. 5 until the end of the word. The segment with the address match obeys the decoded instruction. It will be appreciated that the control effected by the address match can be imposed in the logic 33 itself or in the logic 25 or, as illustrated, in the decoder 24. In any event the relevant MO signals are allowed to be of effect only in the logic 33 of the addressed segment. If the instruction is WRITE, for example, the MO signals will change the configuration of the addressed segment from that of FIG. 5 to that of FIG. 6 during the data field so that the instruction data of FI is written into RI.

The way in which the processor is set up to perform a program is as follows. The program itself, consisting of a plurality of sub-routines, each consisting of a plurality of words, is entered by the central supervisary circuit, (from a conventional peripheral input device) into the slow line. Each word includes at least its address. Some words will have an instruction in the instruction field, with $b_1 = 1$. Some words will have $b_o = 1$. Words may or may not have data entered at this stage. In a typical situation a program without data will be entered. The data will be inserted in the data fields of the appropriate words by addressed WRITE command on the fast line. Supplementary data can similarly be introduced during processing. Intermediate and final result data can be extracted during or at the end of processing by addressed READ commands on the fast line.

Figure 10:
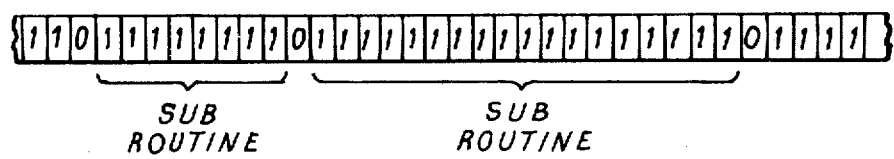
FIG. 10 shows a sub-route format.

As indicated, a program is organised in a plurality of sub-routines, each occupying a major loop. FIG. 10 shows a portion of the slow line. Each small rectangle represents one segment (FIG. 3) of the slow line and the "0" or "1" indicates whether the bit $b_o$ therein is 0 or 1. Each sub-routine consists of a plurality of words all having $b_o = 1$. The sub-routines are separated by words with $b_o = 0$.

Figure 11:
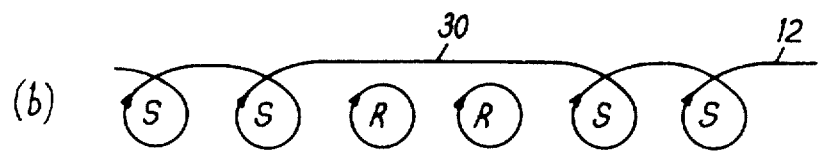
FIG. 11 shows how a sub-route progresses along the slow line.
Figure 11:
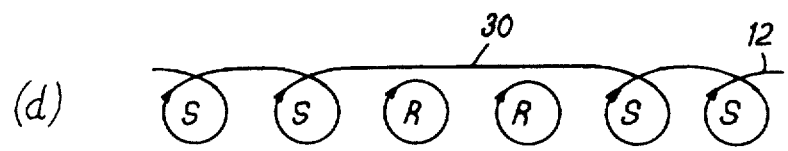

Once a sub-routine is in the slow line it can execute itself independently of instructions on the fast line and independently of other sub-routes. To illustrate the principle FIG. 11 shows the trival case of a sub-routine of only three words, A, B and C. The situation commences with C as the back word next to a word with $B_o = 0$, as shown at (a). This conjunction causes the configuration of FIG. 11(b) to be assumed so that C passes by B and A and the situation of FIG. 11(c) is reached. In FIG. 11(b) the closed loops R represent segments in the recirculating configuration of FIG. 5, the closed loops being by-passed as in FIG. 5 by connections 30. The loops S connected in the slow line 12 represent segments in the serial configuration of FIG. 4.

As word C passes words B and A, instructions can be performed as commanded by the instruction field of C and as further explained below, if C has $b_1 = 1$. The configuration of FIG. 11(d) is then assumed and the situation of FIG. 11(e) is reached. This procedure continues until halted by a jump condition or an interrupt with $FIb_o = 0$ from the fast line. Thus within a major loop, as it progresses along the slow line, the last word repeatedly jumps to the front position and, as it passes the other words, processing operations can be performed. If necessary the major loop can roll round in this way several complete times to perform a sub-routine iteratively.

Figure 12:
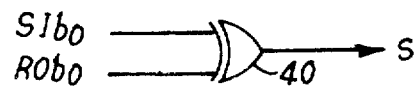
FIG. 12 shows a further part of one minor loop.

The configurations of FIG. 11(b) and FIG. 11(d) are set up entirely automatically. FIG. 12 shows that part of the instructions detector 19 of FIG. 3 which determines whether a segment adopts the serial or recirculating configuration. An exclusive OR gate 40 responsive to $b_o$ of SI and $b_o$ of RO provides a signal S which is arranged to switch from the recirculating configuration and establish the serial configuration by corresponding control of the routing logic 33. Thus whenever adjacent words have $b_o = 0$ and $b_o = 1$, or vice versa, the segment with the front word enters the serial configuration of FIG. 4. Otherwise the recirculating configuration of FIG. 5 obtains.

The instruction detector 19 responds to $SIb_1 = 1$ (denoting a command) to cause the address comparator 26 to compare restricted address fields of RO and SI and to provide the signal on line 27 if there is a match. The restricted address fields are 1 bit less than the full address fields, e.g. $b_{m-1}$ is omitted from the comparison when R is true. All words have individual, unique full addresses so that words can be addressed individually by the fast line but within a sub-routine there are pairs of words whose addresses differ only in respect of $b_{m-1}$. Such words will produce an address match when R is true. In general one such word, say word $C_1$ will be a command word with $b_1 = 1$. The other words, say word A, will be a non-command with $b_1 = 0$. If the command (instruction in C) is ADD, for example, the configuration of FIG. 8 will be established during the data field, the ALU 36 will be commanded to ADD and the data in A will be added into the data in C.

Considering FIG. 11(b) as word C passes A, for example, there may be an address match. If so the combination of the match flag (line 27), R and the instruction in the instruction field of C (which is SI at the A word segment) causes the correctly timed MO signals to set up the required configurations of the logic 33 in the different fields of the words and to command the ALU 36 to perform the selected operation from its repertoire of operations.

A basic instruction set can comprise the operations:
ADD=add SI to RO, sum to RI
ADD 1=add 1 to RO, sum to RI
INVERT=invert RI, RO to RI
SHIFT=delay RO by one bit, RO shifted to RI
EXCHANGE=SI to RI, RO to SO When ADD or ADD 1 produces an overflow bit $b_n = 1$, this may be used like a conventional conditional jump command. A jump may be made by altering $b_o$ bits to repartition the slow line. In particular, if a jump is used to alter $b_o$ from 1 to 0 a sub-routine will be split and thereby prevented from operating. The fast line may then be required to intervene to enter a different pattern of $b_o$ bits in the slow line. $b_o$ can be written in one word by addressing the preceding word and timing the write operation to occur at $b_{n+1}$, i.e. at $b_o$ of the next word. Alternatively a jump can be made without intervention of the fast line by altering $b_o$ from 0 to 1 to join on to the next sub-routine.

Since a single address system is used, programming is clearly subject to a restriction. Operations can only be performed between words whose address fields differ only at $b_{m-1}$. This constraint can be avoided by adding another operation to the repertoire given above. This operation consists in looking for a word not by an address match but as the word with a flag $b_m = 1$ (established by a previous operation). The flagged word is added into the data field of the command "addressed."

A particular example of the application of this technique is to the problem of transferring the data field from a first word to a second word, the words having arbitrary addresses. This is clearly a double address operation. It is effected by two commands, namely a MARK command addressed to the first word and which merely put a flag but $b_m = 1$ in that word, followed by a PICK UP AND WRITE (PUN) command addressed to the second word. The PUN command picks up (reads) the data field of the word with $b_m = 1$ and writes the data field in the addressed word, i.e. the second word. PUN is the only write command needed as its data field can be filled externally when there is no preceding MARK command.

The basic instruction set given above is therefore supplemented with READ, MARK and PUN.

To provide sufficient programming flexibility, a word must be able to jump between sub-routines. A subroutine could flag that it wanted to jump, whereupon a fast line command would be used to READ the word and take it to the CSC 10 which would send it to the correct destination by means of a WRITE (PUN) command. This is cumbersome and an autonomous technique is to be desired.

A BACKWARD JUMP is easily handled by freezing the recirculating state (FIG. 5) of the segment with the jump word therein until the destination advances to that word. A FORWARD JUMP is effected first by employing MARK to mark the jump word. PUN is then employed with the address of a word in a downstream subroutine. When PUN passes a flagged word ($b_m = 1$) it becomes a special word which exchanges with the ensuing separator word having $b_o = 0$. When a separator word contains a jump command, it blocks the back word in the next downstream sub-routine from proceeding forward and barrels down forwards itself. Thus a FORWARD JUMP word jumps across sub-routines one at a time, each time "resting" for one word time in the separator word location. All the while it suppresses the normal forward leapfrog of the sub-routines which it is passing over.

Two very different examples of use of the invention will be described very briefly. There is currently considerable interest in data compression to facilitate storage of abstracts, etc., on magnetic disc (for computer controlled access to information indexed by various keywords). The data compression is employed to reduce the storage requirements and involves looking for common letter patterns (e.g., TION or ING) and replacing these by single characters (outside the normal alphabet). When information is recalled it is straightforward to replace the single characters by their full forms. However, the data compression involves searching for the letter patterns and is difficult to perform at high speed.

The described apparatus is well suited to handle the problem. The coded text to be compressed is entered in the slow line. Then codes of the letters to be searched for and in another part of the store are used as masks and the ALU's are employed to flag characters. E.g., if looking for ING, all G's will initially be flagged. Then an N search will be performed, all G flags will be removed and N's will be flagged only when a flag was present in the next character cell. A further similar step will leave only the I's which belong to ING's flagged. The flagged groups can now be replaced (a write operation) by the corresponding single character. When all letter groups have been dealt with in turn, the text will have all chosen letter groups replaced by single characters. The gaps created in the text can be closed up in the store itself (by recirculating configuration minor loops with no character) or upon readout from the store.

A totally different application relates to the provision of a digital analog of the radar representation of a volume of air space, e.g., for use in a collision avoidance system for the busy air space over a major airport. The volume of air space can be scanned by scanning an antenna in azimuth and elevation and sorting the radar returns for each look direction into range bins. The volume of air space is thus effectively divided up into a three-dimensional array of cells defined by azimuth, elevation and range coordinates. The strengths of the returns of all the cells can be converted to digital values and stored in the slow line or store of apparatus of the nature described above. The digital data will appear in strings, one string for each look direction and the strings will be appended to each other in the slow line or store, each segment of the store corresponding to one cell of the array.

In order to maintain an accurately updated representation, the following operations may be performed. In the first place, as the volume of air space is repeatedly scanned, the value in each cell should be incremented in proportion to the strength of each return obtained for that call. Secondly, the value in each cell should be decremented by a predetermined proportion of the said value. Thirdly, the value in each cell should be incremented by predetermined proportions of the values in the 26 adjacent cells. These operations together will build up a proper representation of true targets in the air space. Spurious "targets" arising from clutter and other noise will be averaged out whereas true targets will build up into blobs spreading over a group of cells. The cell values can be interpreted as probabilities that a target exists in the corresponding volume of airspace. The blobs of moving targets will tend to elongate or become comet-like.

Now it is apparent that the three operations listed above are in themselves very simple arithmetical operations which could be performed readily, using known techniques, by the ALU's 36. However, the third operation requires interaction between cells which are adjacent in the array but which are represented in the store in segments which are, with two exceptions, not adjacent. The two exceptions pertain to the cells which have the same azimuth and elevation as the cell under consideration but have ranges one unit less than and one unit more than the range of the cell under consideration. These cells will have adjacent segments, i.e., minor loops in a string.

The problem is, therefore, to present to the ALU's 36 all pairs of segments which are involved in the third operation. It can be seen that the apparatus described is admirably suited to do this. The aforesaid strings can be assigned to major loops, i.e., each major loop represents one radar scan in a given look direction. By appropriately programming the recirculating and serial configurations of the minor loops within all strings, the operations involving adjacent segments can be performed. By appropriately programming also recirculating and serial configurations of the major loops, the segments which are in different major loops can be brought together for performance of the operations therebetween. The instructions which control the arithmetical operations listed above will have been entered into the slow line or store upon setting up the apparatus and will remain unchanged while the data changes to maintain the updated representations. The instructions which control the configuration to bring segments together for processing may be sent down the fast line.

For collision avoidance purposes, it is desirable to operate unambiguously identified targets. Such targets may be identified by thresholding the probability values derived as explained above and entering hand target data in a second slow line or store, e.g., every two seconds. Alternatively hand target data may be derived entirely conventionally, e.g. by use of a secondary radar system. In any event, the hand target data has to be processed in such a way as to compare every target with all other targets. Such comparison may, in the simplest possible case, involve detection of targets which are closer than a permitted minimum distance but will preferably involve use of velocity information in the hand target data to detect closing targets which are closer together than the permitted minimum distance. When two craft on potential collision courses are detected, the controller will institute appropriate avoiding action. The types of computations needed for collision avoidance are known; the present invention provides a ready way whereby every possible pair of targets can be processed. This is effected by extracting the data for each target in turn from the slow line store and sending it down the fast line for processing against all other targets by way of the individual ALU's 36.

I claim:
1. A data processing apparatus comprising
a central unit;
a serial store formed of a plurality of segments each with input and output terminals connected in a chain to form a serial path for data and instructions from the central unit, via successive segments and back to the central unit;
timing means to effect passage of data and instructions along the said path;
each segment including a shift register, an arithmetic and logic unit, and switching means operable in a first mode to set up a serial configuration in which the segment input terminal is connected to the input terminal of the shift register and the output terminal of the shift register is connected to the segment output terminal, operable in a second mode to set up a recirculating configuration in which the segment input terminal is connected to the segment output terminal by a bypass line and the register output terminal is connected to the register input terminal by a feedback connection, and operable in a third mode to set up a processing configuration in which the segment input terminal and register output terminal are connected to inputs of the arithmetical and logic unit and an output of the said unit is connected to at least one of the register input terminal and segment output terminal;
and each segment further including control means responsive to instruction information received on the said serial path to switch between the said first, second and third modes.

2. Apparatus according to claim 1, wherein said apparatus processes words having a preliminary flag bit, and each segment further comprises a logic circuit responsive to the two preliminary flag bits at the segment input terminal and the register output terminal to select the serial configuration when the two flag bits have at least one predetermined combination of values and to select the recirculating configuration when the two flag bits have at least one other predetermined combination of values, and an instruction decoder responsive to an instruction in the word entering the segment input terminal to change the configuration from the recirculating configuration to the processing configuration and to select a processing operation performed by the arithmetic and logic unit.

3. Apparatus according to claim 1, wherein said arithmetic and logic unit is an instruction-controlled unit selectively performing a plurality of different arithmetical and logic operations, and is responsive to part of the information fed thereto to select which of said plurality of different arithmetical and logic operations is performed.

* * * * *